May 22, 1951 W. L. GROENE 2,553,966
METHOD OF BROACHING ROTATING WORK
Filed March 29, 1949 3 Sheets-Sheet 1

*INVENTOR.*
BY Willard S. Groene

May 22, 1951 W. L. GROENE 2,553,966
METHOD OF BROACHING ROTATING WORK
Filed March 29, 1949 3 Sheets-Sheet 3

INVENTOR.
BY Willard L. Groene

Patented May 22, 1951

2,553,966

UNITED STATES PATENT OFFICE 2,553,966

METHOD OF BROACHING ROTATING WORK

Willard L. Groene, Phoenix, Ariz., assignor to The R. K. LeBlond Machine Tool Co., Cincinnati, Ohio, a corporation of Delaware Application March 29, 1949, Serial No. 84,143

7 Claims. (Cl. 90—33)

This invention pertains to an improved method of broaching rotating work. More particularly this invention pertains to a metal working procedure in which a series of cutting edges of the cutting tool are rapidly and successively presented to and withdrawn from cutting position relative to a workpiece rotating rapidly at a cutting speed.

One of the objects of this invention is to provide a method by which the loss of time between successive presentation of each cutting tooth of a broach to a rotating workpiece is eliminated and to thus prevent the non-cutting time in the machining cycle.

Another object of this method is to make possible the use of much higher cutting speeds by only allowing a cutting edge of the cutting tool or broach to remain in cutting contact with the work for a small interval of time, and then to replace it immediately without loss of cutting time, with other cutting edges successively presented to cutting position.

Another object of this invention is to provide a method of presenting a series of cutting edges of a broach to the periphery of a rotating workpiece in an intermittent manner so that each tooth moves at rapid traverse to a cutting position, continues to move at a feed rate while in cutting position, and to momentarily stop and dwell at the conclusion of its cutting operation, and then to present the next and successive teeth in the same manner.

Still another object of this invention is to provide a method of presenting a series of stepped broached teeth of a broach to a rotating workpiece by the intermittent movement of the broach in variable rates of movement and dwell in timed relationship to the spacing or pitch of the broach teeth.

A further object of this invention is to provide a series of cutting edges about the periphery of a broaching cutter, and to rotate the cutter at intermediate variable rates of rotation and dwell relative to a workpiece rotating at a cutting speed.

And it is also an object to cause a relative infeeding movement between the axis of rotation of the broach cutter and the rotating workpiece during said intermittent rotary movement of the cutting teeth of the broaching cutter.

Further features and advantages of this invention will appear from the following detailed description of the drawings in which.

Figure 1:
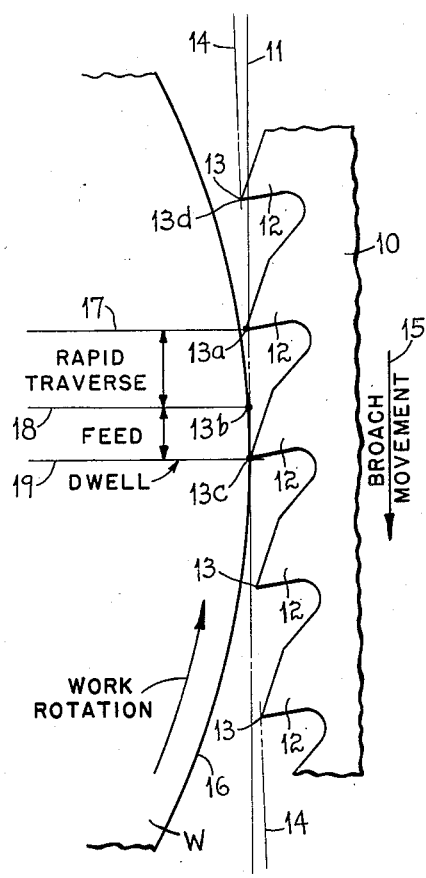
Figure 1 is an enlarged diagrammatic view showing the relationship of the broaching teeth to the rotating workpiece being machined, in which the work surface and broach teeth move relatively in opposite directions.

In one form of this invention there is utilized a straight broach 10 which is moved in relative tangential rapid traverse and feeding movements indicated by the line 11. A series of broach teeth 12 are formed on the broach 10 so that their cutting edges 13 are disposed in a plane 14 which is slightly angularly related to the direction of feeding movement 11 so that each cutting edge 13 successively projects outwardly toward the work surface being machined from each preceding tooth as the broach is fed in a direction indicated by the arrow 15. The workpiece W having the cylindrical work surface 16 to be machined, is rotated at a relatively rapid cutting speed. In this arrangement the peripheral or surface speed of the surface 16 is as great as or considerably above well accepted standards for surface speeds in machine tools.

In prior apparatus of this kind it has been the practice to feed the broach 10 at a uniform continuous movement while presenting the cutting edges to the work surface 16. In this invention, however, it is the object to intermittently vary the rate of feeding movement and to cause a dwell or stopping of this motion in relationship to each cutting tooth presented to the workpiece. For instance, taking the cutting edge 13a, Figure 1, is positioned as indicated by the line 17, the broach 10 is first moved at a very rapid traverse movement to quickly bring the cutting edge 13a rapidly to the position 13b indicated by the line 18, at which point the cutting edge begins to engage and cut the work surface 16. At this point the broach movement indicated by the arrow 15 is reduced to a slow feed rate while it continues to cut the work surface 16 until it feeds down to the position 13c indicated by the line 19, at which point further cutting action of the tooth ceases. At this point the broach 10 is stopped in motion and the cutting edge allowed to dwell at 13c during at least one complete revolution of the work surface 16 so as to complete a true cylindrical diameter on the workpiece before proceeding with the presentation of the next cutting tooth edge to the work in a manner just described for the cutting edge 13a. The stepped positioning of the cutting edges 13 in the plane 14 provides the necessary radial in-feeding of the cutting edges relative to the axis of rotation 20 of the work W.

Figure 2:
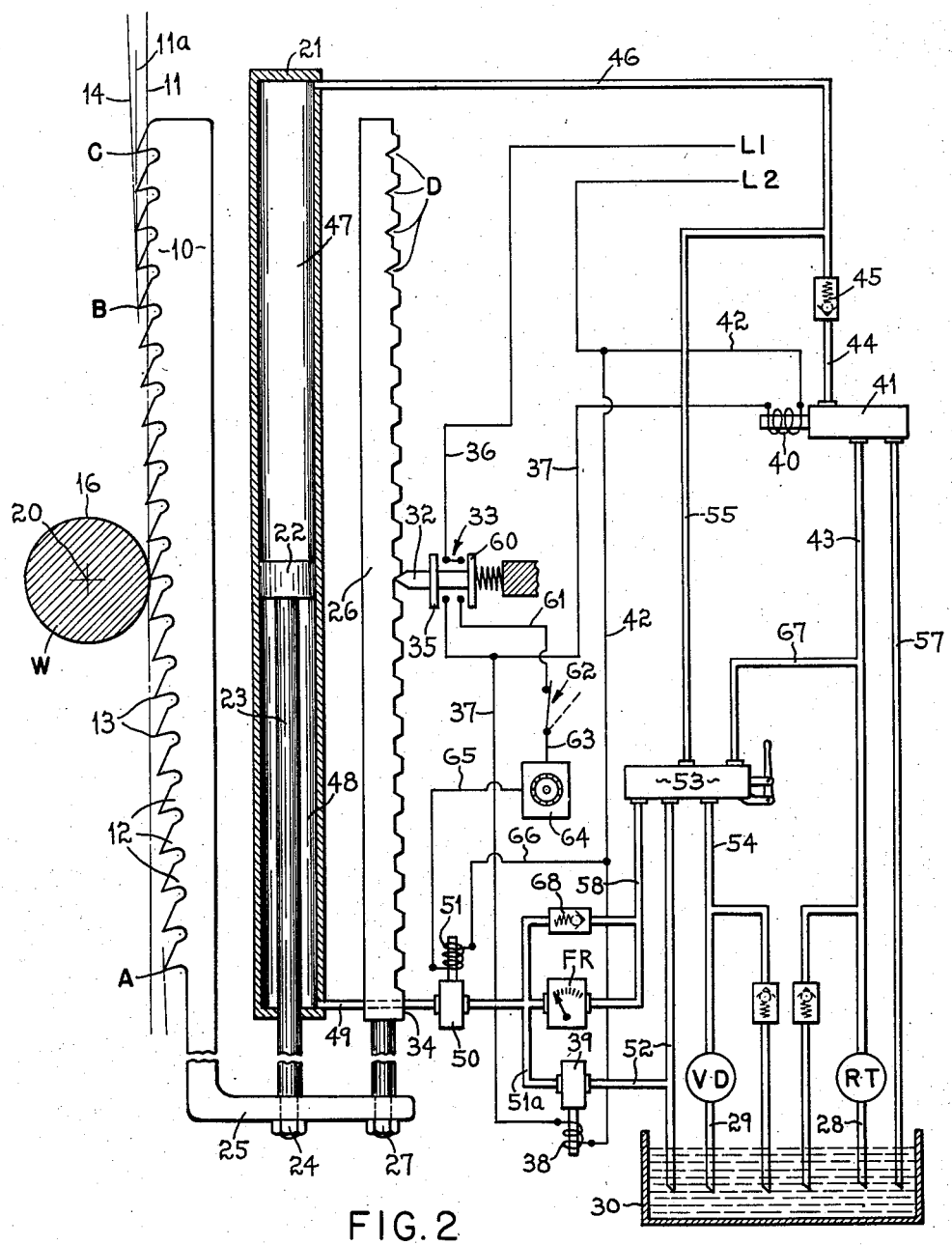
Figure 2 is a circuit diagram of a hydraulic and electrical circuit adapted to effect the relative intermittent motion of the work and broach.

The aforementioned rapid traverse, feed, and dwell for the broach movement 15 is accomplished automatically, for example, by an arrangement shown in Figure 2. In this arrangement there is provided a hydraulic motor or cylinder 21 in which is reciprocatably mounted the piston 22 having a piston rod 23 rigidly connected through a suitable connecting means 24 to an arm 25 fixed to the broach 10 so that reciprocation of the piston 22 in the cylinder 21 effects similar reciprocation of the broach 10. Also connected to be moved with the piston 22 and the broach 10 is the control cam 26 having a suitable connection 27 with the arm 25 of the broach 10. The piston 22 is actuated by fluid pressure derived from a rapid traverse pump RT and a variable delivery feed pump VD, each receiving a supply of hydraulic fluid through the respective suction lines 28 and 29 from the fluid reservoir 30.

Figure 4:
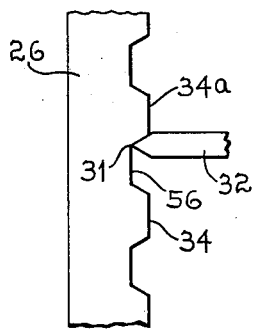
Figure 4 is an enlarged fragmentary view of a portion of the control cam shown in Figure 2 for controlling the broach movement during the initial stages of the cutting cycle.

At the beginning of the cutting cycle the tip 31 of the plunger 32 of the control switch 33 is located on one of the high points or lands 34 of the control cam 26, Figure 4, so that its switch bar 35 interconnects the lead 36 to the lead 37 to cause current from the supply lead L1 to be connected to the solenoid 38 of the valve 39 and to the solenoid 40 of the valve 41, the return lead 42 completing the circuit back to the other supply lead L2. When solenoid 40 of valve 41 is thus energized, fluid supply from the rapid traverse pump RT passes through the line 43 into the line 44 and through the ball check valve 45 to the line 46 connected to the forward feed chamber 47 of the cylinder 21. The return chamber 48 of the cylinder 21 is connected for discharge of fluid through the line 49, and then freely through the stop or dwell valve 50 which has its solenoid 51 de-energized at this time so that the valve is open. The flow from the open valve 50 passes through the line 51a to the valve 39 which is open at this time because its solenoid 38 is energized allowing the fluid to pass into the drain line 52 for the return of fluid to the reservoir 30.

The manually operated control valve 53 is set at this time so that fluid pressure from the variable delivery pump VD is connected from the line 54 to the line 55 which in turn is connected to the line 46 so as to continuously supply the chamber 47 of the cylinder 21 from the variable delivery pump VD. As the rapid traverse movement of the broach continues, the plunger 32 of the control switch 33 drops down on to the intermediate land 56, Figure 4, of the control cam 26 to thus disconnect lead 36 from lead 37 which de-energizes solenoid 40 of valve 41 to cut off the supply from the rapid traverse pump RT and connect the line 43 to the drain line 57 for return of the rapid traverse pump fluid to the reservoir 30. The solenoid 38 of the valve 39 is also de-energized cutting off discharge of fluid from the line 51a to the line 52 and causing this flow to now take place through the feed rate control valve FR into line 58 which is connected through the valve 53 to the drain line 52.

During the initial diameter reducing cutting stages between points A and B of the broach, Figure 2, where the teeth are arranged in stepped position in a plane indicated by the line 14, it may not be necessary to utilize the dwell of the cutting edges of the broach teeth at the position 13c, in which case the plunger 32 of the control switch 33 again is brought up on the next high surface 34a of the cam 26, Figure 4, to again cause the rapid traverse movement of the broach to present the next cutting tooth into cutting position as described. The aforementioned operating cycle of rapid traverse and feed movement of the broach 10 continues in timed relationship with the position and spacing of the broach teeth by arranging the position of the control surfaces 34 and 56 of the cam 26 with the same spacing and in proper position relative to the teeth of the broach and the plunger 32 of the control switch 33.

In certain cases it is desirable to also utilize a dwell at the conclusion of each feed movement of a broach tooth before proceeding at rapid traverse to present the next tooth, this dwell continuing sufficiently long enough for the work to have rotated at least one or slightly more than one complete revolution with the cutting edge of the broach tooth in the position 13c. This is particularly desirable on that portion of the broach between the points B and C where the cutting edges of the broach teeth are all located in the same plane 11a parallel to the line of feeding 11. When this portion of the broach is applied to the work there is provided a still deeper notch 59, Figure 5, in the cam 26 which causes the plunger 32 of the control switch 33 to bring the switch bar 60 into contact so as to connect lead 36 to lead 61. Lead 61 is connected through a manually operated disconnect switch 62 connected by a lead 63 to a timer 64 which is connected through a lead 65 to the solenoid 51 of the stop valve 50, which in turn is connected through a lead 66 and the lead 42 to complete the electrical circuit. Energizing the solenoid 51 causes the valve 50 to close off the line 49 so as to trap the fluid in the chamber 48 of the cylinder 21 to thus hold the broach 10 against movement for the dwell. The length of the dwell is determined by the setting of the timer 64 and after a predetermined interval, set so as to be sufficient to allow at least one complete revolution of the workpiece, it opens the circuit between the leads 63 and 65 to de-energize the solenoid 51 to again open the valve 50 for free flow of fluid between the lines 49 and 51a.

Figure 5:
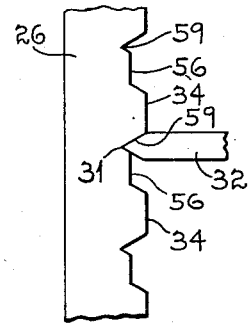
Figure 5 is an enlarged fragmentary view of the control cam for controlling the broach movement during the final stages of the cutting cycle.

The cam surfaces at D, Figure 2, may be made as shown in Figure 5, to accomplish the dwell for the teeth of the portion B to C of the broach 10 while the remaining portion of the cam surfaces may be arranged as shown in Figure 4. Another way is to make the entire cam with surfaces as in Figure 5, and to utilize the cut-out switch 62, either manually operated or controlled from the movement of the cam 26 in any well known manner, to cut in or cut out the dwell function at any point in the cutting cycle.

The broach is returned to initial starting position at the conclusion of the cutting cycle by manipulating the valve 53 so as to connect rapid traverse pump pressure from the line 43 through the line 67 to the line 58 from which it passes through the ball check 68, the line 51a, freely through the valve 50, through the line 49 into the return chamber 48 of the cylinder 21. Discharge from the chamber 47 of the cylinder 21 passes through the line 46 and the line 55 through the valve 53 to the drain line 52.

Figure 3:
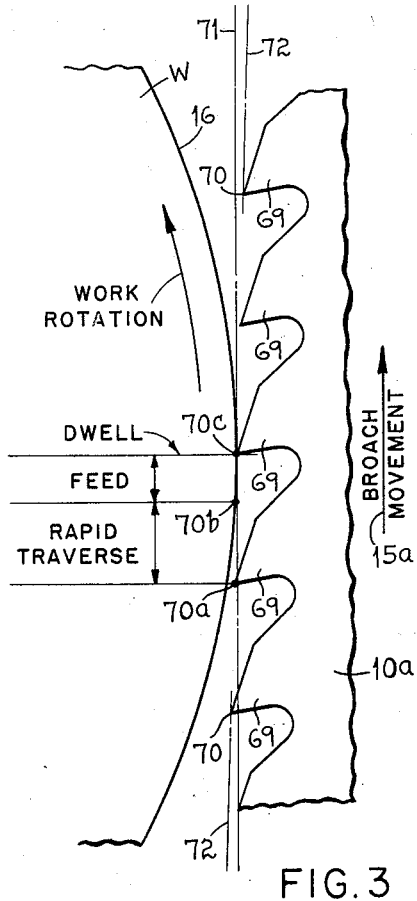
Figure 3 is a diagram similar to Figure 1, showing the relationship of work and broach where the work and broach move relatively to each other in the same direction.

The aforementioned principles of actuating the broach 10 at rapid traverse, feed, and dwell in relationship to the broach teeth is well adapted to an arrangement such as shown in Figure 3, in which the broach movement indicated by the arrow 15a, takes place in the same direction as the rotation of the work surface 16. Since the work surface 16 is rotating at a rapid cutting speed, the work surface overtakes the cutting edges of the broach so that during the feeding motion of the broach a cutting of the work surface is accomplished. The cutting teeth 69, having cutting edges 70, move in a line of feeding movement 71 with their cutting edges located in stepped position as indicated by the line 72. By utilizing the arrangement of Figure 2, the cutting edge 70a moves at rapid traverse movement to position 70b and at feed movement to position 70c where the dwell may then be effected as desired.

Figure 6:
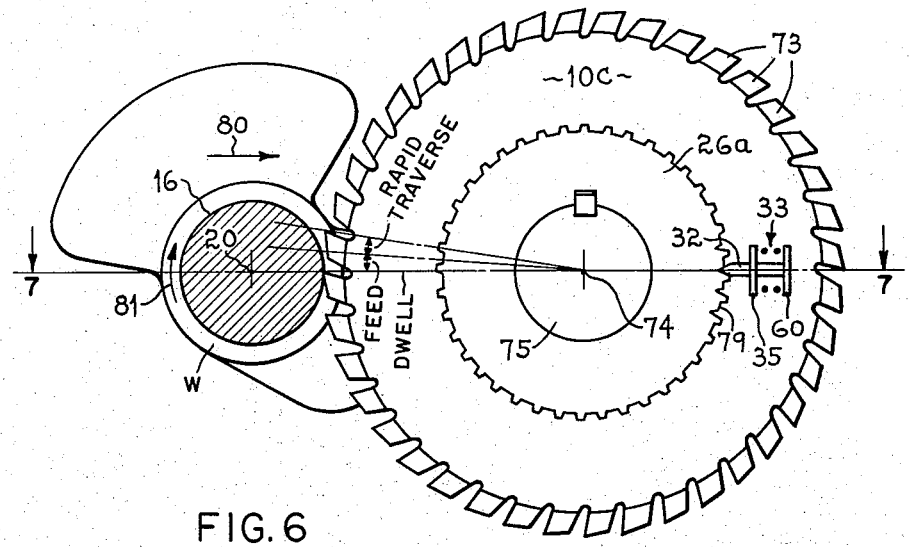
Figure 6 is a diagrammatic view showing an arrangement in which rotary broaching cutter is utilized.
Figure 7:
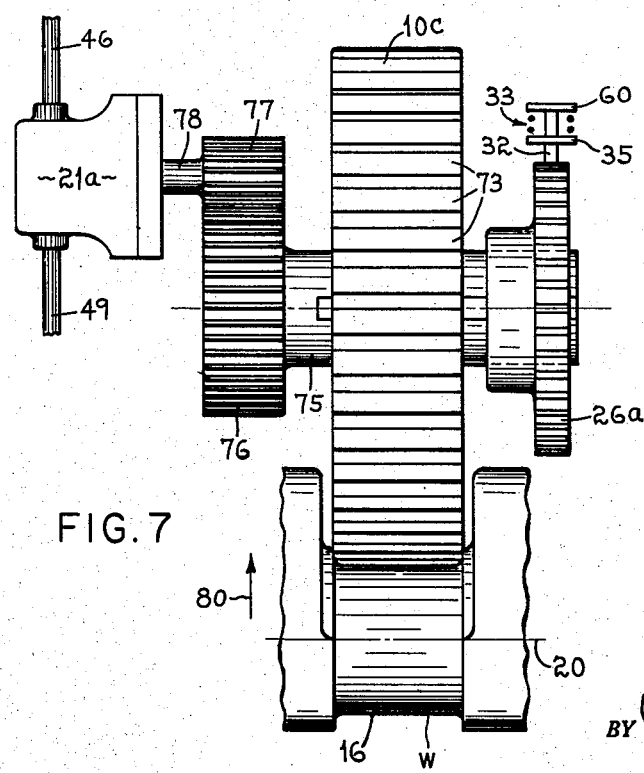
Figure 7 is a view of the driving and control mechanism for the rotary broach arrangement, indicated by the line 7—7 of Figure 6.

Still another arrangement utilizing the principles of this invention is that shown in Figures 6 and 7, wherein the broach teeth 73 are arranged eccentrically around the periphery of a circular or rotary broach cutter 10c. The cutter 10c is mounted for rotation about an axis 74 on a shaft 75 to which is fixed a gear 76 which in turn is driven from a pinion 77 on the shaft 78 of the hydraulic motor 21a, this motor being connected in the circuit of Figure 2, the same as the cylinder 21. By controlling the fluid motor 21a, the cutter 10c is intermittently rotated at rapid traverse, feed, and dwell in timed relationship to the pitch or spacing of the cutting teeth 73. In this arrangement the control cam 26 of Figure 2 takes the form of a circular cam 26a fixed to the shaft 75 so as to rotate with the cutter 10c. The same cam configurations 79 are arranged about the periphery of the cam 26a so as to appropriately actuate the control switch 33 to perform the functions as described.

In this arrangement of the circular cutter with the concentrically arranged teeth 73, the progressive relative radial in-feed of work and tool is accomplished by moving the axes 20 and 74 of the work W and the broach cutter 10c toward each other as indicated by the arrow 80. This movement continuously takes place until the proper diameter for the work surface is reached, at which time and by apparatus of well known character, the in-feed movement is stopped and the cutting teeth 73 are stopped at dwell position so as to finish size work to correct concentric diameter. In this arrangement, of course, the work is rotating at a rapid cutting speed in a direction as indicated by the arrow 81 and the cutter 10c may be rotated in either direction to accomplish the desired intermittent rapid traverse, feed, and dwell movements for the cutting teeth in timed relation to their spacing around the periphery of the cutter.

Having thus fully set forth and described this invention what is claimed and desired to be secured by United States Letters Patent is:

1. The method of broaching rotating work comprising, rotating a workpiece about an axis at a rapid cutting speed, moving in a step-by-step manner a series of cutting edges lying parallel to said axis relative to a work surface of said workpiece in a direction tangentially to said work surface, presenting said cutting edges into a cutting position relative to the work surface by moving each of said cutting edges, first at a rapid traverse movement to begin its cutting operation, and then in a slower feed movement to complete the cutting operation.

2. The method of broaching rotating work comprising, rotating a workpiece about an axis at a rapid cutting speed, intermittently moving a series of cutting edges lying parallel to said axis relative to a work surface of said workpiece with a step-by-step movement in a direction tangentially of said work surface, presenting said cutting edges into cutting position in a plane passing through said axis and perpendicular to said direction of tangential movement relative to the work surface by moving each of said cutting edges, first at a rapid traverse movement to begin its cutting operation, and then in a slower feed movement, and finally holding said cutting edge in dwell at the completion of its cutting operation during at least one complete revolution of the workpiece.

3. The method of broaching a rotating cylindrical workpiece comprising, rotating the workpiece surface about an axis at a rapid cutting speed, moving a series of stepped broach teeth cutting edges positioned parallel to said axis in a line of feeding movement tangentially of the work surface, and intermittently actuating said series of cutting edges in rapid traverse and slower feed movements in a predetermined timed relationship to the position of each successive broach tooth cutting edge relative to a plane passing through said axis perpendicular to said line of tangential feeding movement.

4. The method of broaching a rotating cylindrical workpiece comprising, rotating the workpiece surface at a rapid cutting speed, intermittently moving a broach comprising a series of stepped broach teeth having cutting edges located parallel to the axis of rotation of said workpiece in a line of feeding movement tangentially of the work surface by actuating said broach at a rapid traverse and a slower feed and dwell movements in timed relationship to the position of each successive broach tooth cutting edge relative to said workpiece axis.

5. A method of broaching rotating work comprising, rotating a workpiece at a rapid cutting speed, intermittently moving a series of broach teeth with cutting edges parallel to the axis of rotation of the workpiece tangentially to and in the opposite direction to the rotation of the work surface to be machined, and actuating said broach teeth so as to successively present said cutting edges at a rapid traverse rate to cutting position, and at a slower feed rate to complete the cutting operation, in a timed relationship to the position of each successive cutting edge relative to the workpiece.

6. The method of broaching rotating work comprising, rapidly rotating a cylindrical workpiece at a cutting speed, intermittently tangentially presenting a series of cutting teeth having cutting edges parallel to the axis of rotation of the workpiece by movement in the same direction as the direction of rotation of the work surface being machined, said last mentioned movement being performed at a rapid traverse, a slower feed, and dwell movement in a predetermined timed relationship to the spaced position of each successive cutting tooth relative to the workpiece.

7. The method of broaching rotating work comprising, rotating a workpiece at a rapid cutting speed, moving a series of broach teeth having cutting edges parallel to the axis of rotation of said workpiece in a circular path relative to the work surface to be machined with intermittent rapid traverse, slower feed, and dwell movements in timed relationship to the spacing of said cutting edges of said teeth in said circular path, and causing relative movement between said axis of rotation of the work and the axis of rotation of the circular path of movement of said broach teeth.

WILLARD L. GROENE.

REFERENCES CITED

The following references are of record in the file of this patent:

UNITED STATES PATENTS

| Number | Name | Date |
| --- | --- | --- |
| 482,211 | Tucker | Sept. 6, 1892 |
| 2,044,494 | Bullard | June 16, 1936 |
| 2,044,495 | Bullard | June 16, 1936 |
| 2,233,399 | Carlin | Mar. 4, 1941 |
| 2,362,318 | Staples | Nov. 7, 1944 |